US012292620B2

United States Patent
Tanaka et al.

(10) Patent No.: US 12,292,620 B2
(45) Date of Patent: May 6, 2025

(54) OPTICAL DEVICE

(71) Applicant: MITUTOYO CORPORATION, Kanagawa (JP)

(72) Inventors: Yuki Tanaka, Kanagawa (JP); Ken Motohashi, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 523 days.

(21) Appl. No.: 17/896,428

(22) Filed: Aug. 26, 2022

(65) Prior Publication Data

US 2023/0067203 A1 Mar. 2, 2023

(30) Foreign Application Priority Data

Aug. 30, 2021 (JP) ................. 2021-140439

(51) Int. Cl.
  *G02B 7/182* (2021.01)
  *G02B 17/08* (2006.01)
  *G01B 9/0209* (2022.01)

(52) U.S. Cl.
  CPC ....... *G02B 7/1825* (2013.01); *G02B 17/0876* (2013.01); *G01B 9/0209* (2013.01)

(58) Field of Classification Search
  None
  See application file for complete search history.

(56) References Cited

U.S. PATENT DOCUMENTS

| 3,249,008 | A | * | 5/1966 | Angenieux | ............. G02B 7/04 359/813 |
|---|---|---|---|---|---|
| 5,931,428 | A | * | 8/1999 | Ikeda | ................ G01B 5/0002 248/230.1 |
| 6,657,728 | B1 | | 12/2003 | Okabe | |
| 8,553,232 | B2 | | 10/2013 | Matsumiya et al. | |
| 9,921,391 | B2 | | 3/2018 | Motohashi | |
| 11,274,916 | B2 | | 3/2022 | Ishige et al. | |
| 2012/0099115 | A1 | | 4/2012 | Matsumiya et al. | |
| 2016/0131474 | A1 | | 5/2016 | Saeki et al. | |
| 2016/0195384 | A1 | * | 7/2016 | Motohashi | ........... G01B 9/0209 359/578 |
| 2021/0003381 | A1 | | 1/2021 | Ishige et al. | |

FOREIGN PATENT DOCUMENTS

| JP | 2569571 | 4/1998 |
|---|---|---|
| JP | 3343221 | 11/2002 |
| JP | 4201693 | 12/2008 |

(Continued)

*Primary Examiner* — Robert E. Tallman
(74) *Attorney, Agent, or Firm* — Rankin, Hill & Clark LLP (57) ABSTRACT

An optical device provided with an optical parts position adjusting and fixing device for adjusting and fixing the position of the optical parts moving in an optical axis direction, wherein the position adjusting and fixing device is provided with a long slotted hole extended in the optical axis direction formed on a side surface of the optical parts; a fixing means which is mounted on an object to be fixed of the optical parts and which is movable along the long slotted hole; a non-penetrating screw hole formed in the fixing means and which is divided by a slit; and a screw which is screwed into the screw hole and spreads the slit when screwed into the screw hole so as to press the outer surface of the fixing means against the inner surface of the long slotted hole.

7 Claims, 6 Drawing Sheets

(56) References Cited

FOREIGN PATENT DOCUMENTS

| | | |
|---|---|---|
| JP | 2009-053339 | 3/2009 |
| JP | 2011-085655 | 4/2011 |
| JP | 2012-088180 | 5/2012 |
| JP | 2012-093166 | 5/2012 |
| JP | 2013-104998 | 5/2013 |
| JP | 6461609 | 1/2019 |
| JP | 6508764 | 5/2019 |
| JP | 2020-154167 | 9/2020 |
| JP | 2021-009128 | 1/2021 |

* cited by examiner

PRIOR ART

Fig. 2B

PRIOR ART

MOVING DIRECTION OF INTERFERENCE UNIT

OPTICAL DEVICE

CROSS-REFERENCE TO RELATED APPLICATION

The disclosure of Japanese Patent Application No. 2021-140439 filed on Aug. 30, 2021 including specifications, drawings and claims is incorporated herein by reference in its entirety.

TECHNICAL FIELD

The present invention relates to an optical device. In particular, the present invention relates to an optical device suitable for use in a white light interferometer of a Mirau type, a Michelson type and so on used in image measuring machines, measuring microscopes, and the like.

BACKGROUND ART

Figure 1:
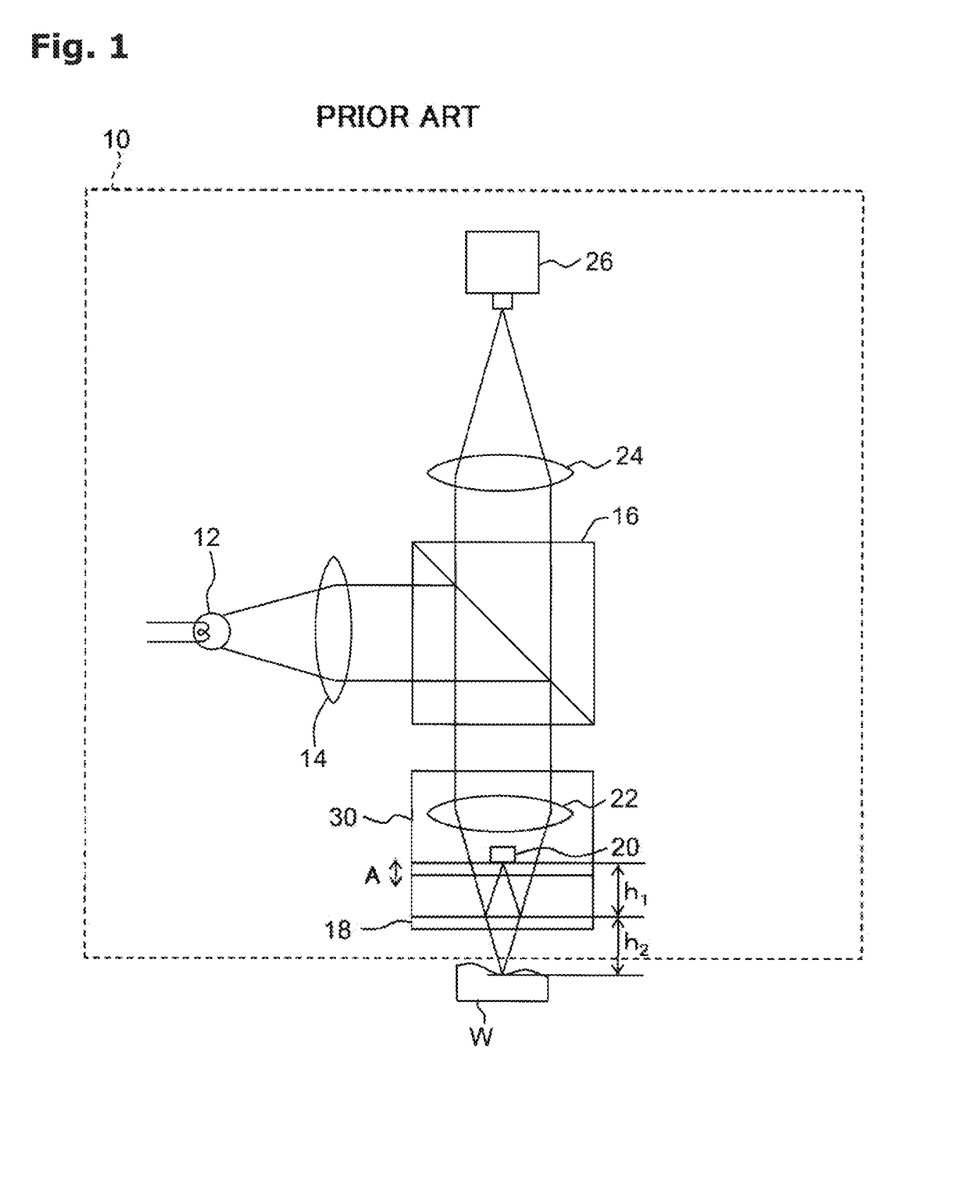
FIG. 1 is an optical path diagram schematically illustrating an optical head of a conventional Mirau type white light interferometer.

Example of main configuration of a Mirau type white light interferometer described in Patent Literature 1 to 5 or the like is shown in FIG. 1. In a non-contact surface shape measurement by a white light interferometer optical head 10, the light irradiated from a white light source 12 is divided by a beam splitter 16 and a half mirror 18 into a reference light to a reference mirror 20 and a measuring light to a measurement target surface such as a work to be measured W. And an interference fringe image generated by an optical path difference of the light reflected from each is observed by a camera 26 including a light receiving array, so as to measure the uneven shape of the work to be measured W based on the intensity of the interference fringes. In the drawing, 14 is a collimating lens, 22 is an interference objective lens (hereinafter, simply referred to as an objective lens), 24 is an imaging lens, 30 is an interference unit for generating the interference fringes by adjusting the position of the reference mirror 20 in the vertical direction (direction A in the drawing) which is an optical axis direction.

When the white light interferometer optical head 10 is scanned in the direction (direction A in the drawing) perpendicular to the surface of the work to be measured W, the interference fringes are generated around the position where the optical path difference of the reference light and the measuring light is Zero. By detecting the peak position of the intensity of the interference fringes, using the light receiving element of the camera 26, it is possible to obtain a three-dimensional surface shape (hereinafter simply referred to as a three-dimensional shape) of the work to be measured W.

In addition to the Mirau type white light interferometer as shown in FIG. 1, in which an optical axis of the objective lens 22 and an optical axis of the reference mirror 20 are coaxial, there is the Michelson type white light interferometer as shown in the later-described FIG. 6A and described in Patent Literature 5, Patent Literature 6, and the like, in which the optical axis of the objective lens 22 and the optical axis of the reference mirror 20 are perpendicular.

In such a white light interferometer, the position of the interference unit 30 needs to be adjusted in the optical axis direction (A-direction in the drawing) and fixed to an objective lens body so that the distances $h_1$ and $h_2$ are made equal to each other and the reference light becomes in focus on the reference mirror 20 when the measuring light becomes in focus on the surfaces of work to be measured W.

Therefore, various adjusting and fixing structures have been proposed in Patent Literature 7 to 12, etc., but all of the configuration of each structure are complicated.

Figure 2A:
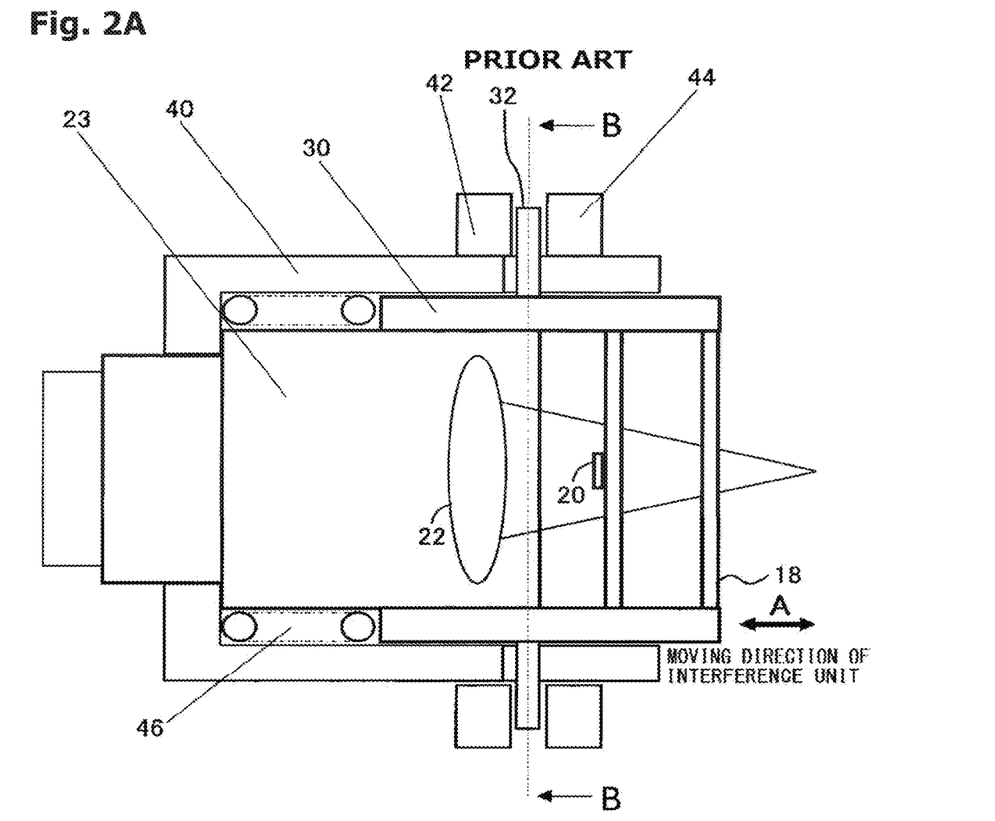
FIG. 2A is a longitudinal cross-sectional view of an interference unit illustrating an exemplary conventional fastening method of the interference unit.
Figure 2B:
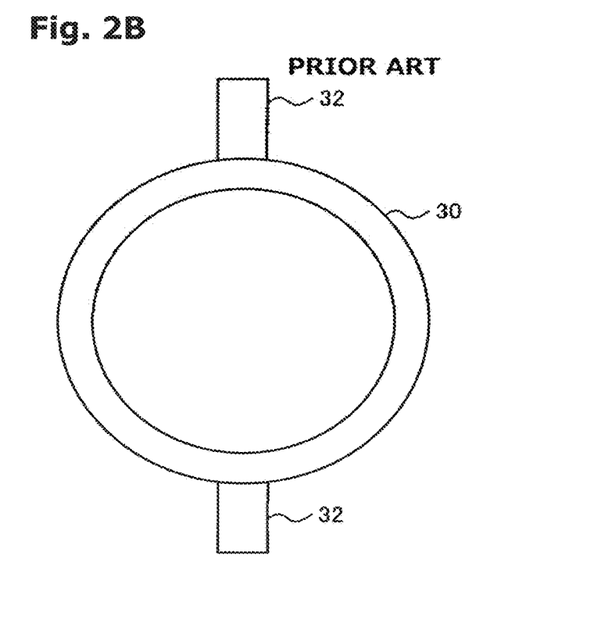
FIG. 2B is a cross-sectional view along line B-B in FIG. 2A.

Therefore, for example, as shown in FIGS. 2A and 2B, a plurality of wings 32 (upper and lower two in FIG. 2B) may be provided with respect to the direction perpendicular to the optical axis of the interference unit 30, toward the outer side. And the wing 32 is sandwiched by an adjust ring 42 and a fixing ring 44 from the top and bottom of the optical axis direction (lateral direction in FIG. 2A) so as to fix. That is, outside of an outer frame 40 of the lens barrel 23 of the objective lens 22, and inside of both the adjust ring 42 and the fixing ring 44 are tapped, and by turning the adjust ring 42 so as to move the reference mirror 20 in up and down direction (i.e. optical axis direction A) (lateral direction in FIG. 2A), the wings 32 are sandwiched by the fixing ring 44 and the adjust ring 42, and the interference unit 30 is fixed. In the figure, 46 is a coil spring.

CITATION LIST

Patent Literature

[Patent Literature 1] Japanese Patent No. 6,508,764
[Patent Literature 2] JP-A-2021-9128
[Patent Literature 3] Japanese Patent No. 6,461,609
[Patent Literature 4] JP-A-2012-93166
[Patent Literature 5] JP-A-2012-88180
[Patent Literature 6] JP-A-2020-154167
[Patent Literature 7] JP-A-2009-53339
[Patent Literature 8] JP-A-2011-85655
[Patent Literature 9] Japanese Patent No. 3343221
[Patent Literature 10] Japanese Patent No. 4201693
[Patent Literature 11] Utility Model Registration No. 2569571
[Patent Literature 12] JP-A-2013-104998

SUMMARY OF INVENTION

Technical Problem

The positioning accuracy of the interference unit 30 is very precisely required in the white light interferometer. However, in the way of rotating the adjust ring 42 from the vertical direction (lateral direction in FIG. 2A) of the wings 32 as shown in the FIG. 2A and applying a force to the optical axis direction to be precisely positioned, the interference unit 30 moves to the optical axis direction at the time of fixing, so it was very difficult to adjust and fix. Such issues arise when optical parts needs to be fixed precisely even in optical devices other than the white light interferometer.

The present invention has been made to solve the above-mentioned conventional problems. The object of the present invention is to enables precise positioning with a simple configuration, by preventing optical axis direction force from being applied to optical parts when fixing the optical parts in the position of the optical axis direction, and suppressing the displacement in the optical axis direction.

Solution to Problem

The present invention provides an optical device provided with an optical parts position adjusting and fixing device for adjusting and fixing the position of the optical parts moving in an optical axis direction, wherein the position adjusting and fixing device is provided with a long slotted hole extended in the optical axis direction formed on a side surface of the optical parts; a fixing means which is mounted on an object to be fixed of the optical parts and which is movable along the long slotted hole; a non-penetrating screw hole formed in the fixing means and which is divided by a slit; and a screw which is screwed into the screw hole and spreads the slit when screwed into the screw hole so as to press the outer surface of the fixing means against the inner surface of long slotted hole.

Here, the fixing means may be formed with a through hole for fitting screw for attaching the fixing means to the object to be fixed of the optical parts, alongside the non-penetrating screw hole.

A plurality of the fixing means may be provided circumferentially around the optical parts.

Further, the optical device may be an interference unit of a white light interferometer, and the optical parts may be a reference mirror for adjusting optical path difference included in the interference unit.

Further, the object to be fixed of the interference unit may be a lens barrel of an interfering objective lens.

Further, the optical device may be an interference unit of a Mirau type white light interferometer wherein an optical axis of an objective lens which is the object to be fixed and an optical axis of a reference mirror included in the interference unit which is the optical parts, is coaxially disposed.

Further, the optical device may be an interference unit of a Michelson type white light interferometer wherein an optical axis of an objective lens which is the object to be fixed and an optical axis of a reference mirror included in the interference unit which is the optical parts, is perpendicularly disposed.

According to the present invention, since the force applied to the optical parts is perpendicular to the optical axis direction when fixing position of the optical parts in the optical axis direction, displacement of the optical parts can be suppressed and precise positioning can be performed with a simple configuration.

These and other novel features and advantages of the present invention will become apparent from the following detailed description of preferred embodiments. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, embodiments of the present invention will be described in detail with reference to the drawings. The present invention is not limited by the contents described in the following embodiments. The constituent elements in the embodiments described below include those easily conceivable by a skill in art, substantially the same, and so-called equivalent ranges. Further, the components disclosed in the embodiments described below may be appropriately combined or appropriately selected and used.

Figure 3:
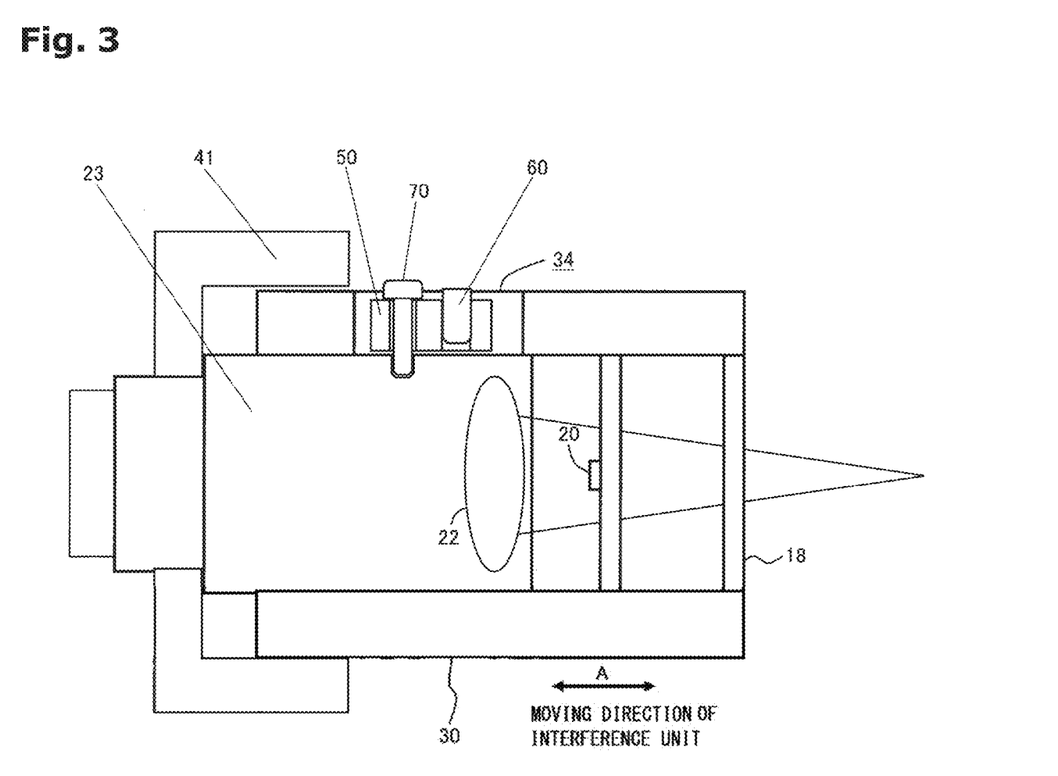
FIG. 3 is a longitudinal sectional view showing a fixing portion of the interference unit in the first embodiment of the present invention applied to the Mirau type white light interferometer.
Figure 4A:
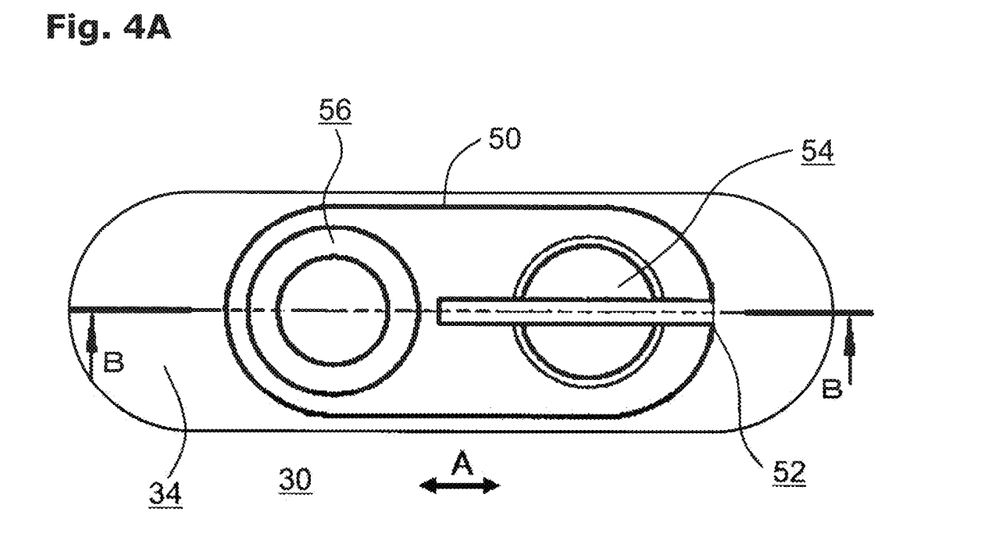
FIG. 4A is a plan view showing the configuration of a key which is a fixing means used in the first embodiment.
Figure 4B:
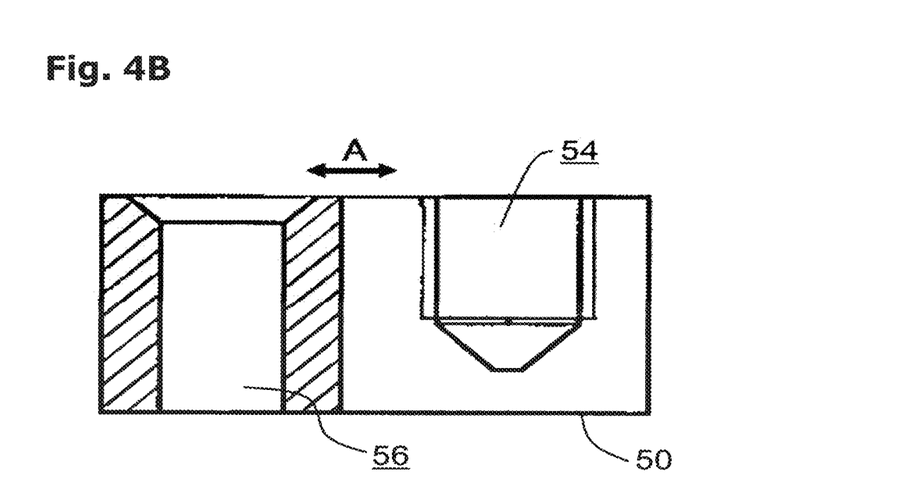
FIG. 4B is a cross-sectional view along line B-B in FIG. 4A.
Figure 5:
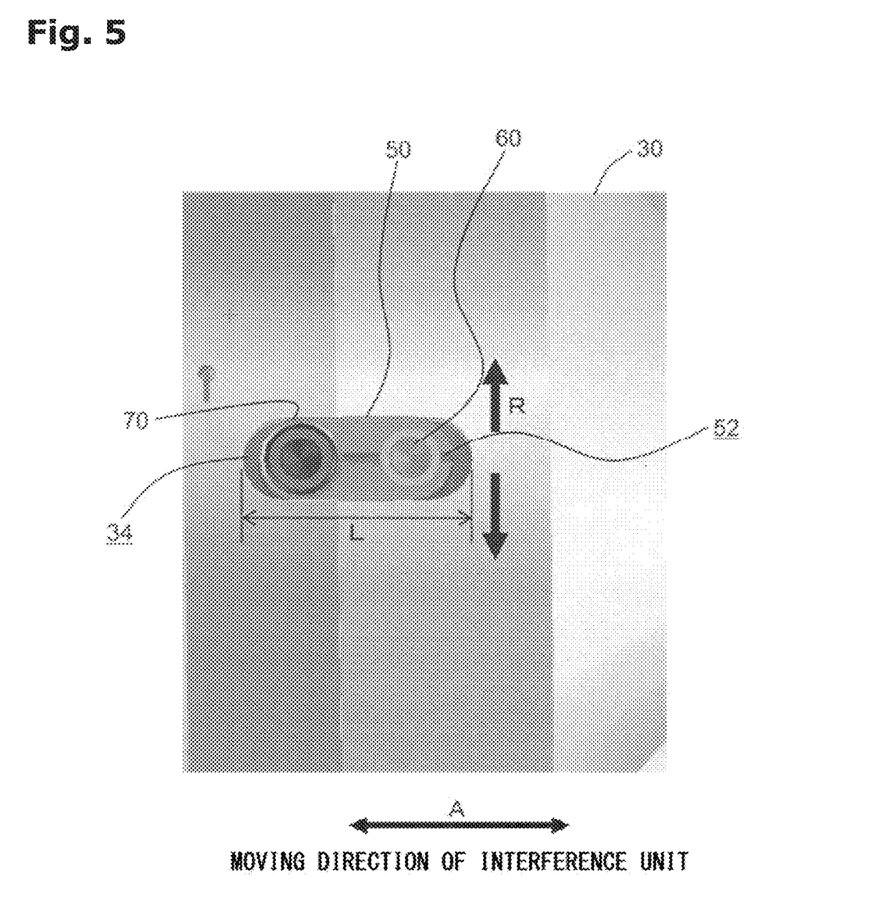
FIG. 5 is a plan view showing how the interference unit is fixed in the first embodiment.

The first embodiment of the present invention has been applied to a position adjusting and fixing device of an interference unit of a Mirau type white light interferometer. As shown in FIGS. 3 to 5, the position adjusting and fixing device of the white light interferometer is used to fix the position of an interference unit 30. The interference unit 30 is one of the optical parts to which a reference mirror 20 for generating a reference light for interfering with a measuring light reflected by a surface of a measurement target. The interference unit 30 is adjusted in the optical axis direction (lateral direction in figure) A of the reference mirror 20 and fixed.

The position adjusting and fixing device is provided with a long slotted hole 34 elongated in the optical axis direction A of the reference mirror 20; a long cylinder like key 50 with two holes 54, 56 as shown in FIG. 4A, which is mounted on a lens barrel 23 of the objective lens 22 that is a fixing object of the interference unit 30 and movable along with the long slotted hole 34; a non-penetrating screw hole 54 as shown in FIG. 4B formed in the key 50 and divided by a slit 52; and a fixing screw 60, screwed in the screw hole 54, pushing the slit 52 outside when screwed, for pressing the outer surface of the key 50 against the inner surface of the long slotted hole 34.

In the key 50, as shown in detail in FIGS. 4A and 4B, is formed with a through hole 56 for a fitting screw 70, alongside the non-penetrated screw hole 54 for fixing screw 60 for mounting the key 50 to the lens barrel 23 of the objective lens 22.

In FIG. 3, 41 is a rotatable adjust ring disposed outside the interference unit 30. On the outer surface of the interference unit 30 and the inner surface of the adjust ring 41 taps are processed. When the adjust ring 41 is rotated, the interference unit 30 is moved up and down (lateral direction in FIG. 3). At this time, the key 50, as shown in FIG. 5, together with the long slotted hole 34, prevent rotation misalignment about its optical axis, in the circumferential direction indicated by an arrow R, when the interference unit 30 is moved up and down indicated by an arrow A. Furthermore, the dimension L in the optical axis direction A of the slotted hole 34 determines adjust stroke when raising and lowering the interference unit 30. That is, if the interference unit 30 is moved excessively upward (leftward in FIG. 5) of the optical axis, it collides with the body of the objective lens 22. Conversely, if moved too far downward (right in FIG. 5) opposite to the objective lens 22, the interference unit 30 will fall off. However, by limiting adjust stroke of the interference unit 30 by the slotted hole 34, it is possible to prevent such fall off.

When adjusting and fixing the position of the interference unit 30, after attaching the key 50 by the fitting screw 70 to the lens barrel 23 of the objective lens 22, the interference unit 30 is moved in the lateral direction (optical axis direction A) of the drawing. And, if the interference fringes appear at the desired position, the fixing screw 60 is tightened so as to spread the slot 52 of the key 50 up and down in FIG. 5, and pressing the outer surface thereof to the inner surface of the slotted hole 34 of the interference unit 30, to fix the interference unit 30 to the lens barrel 23 of the objective lens 22. At this time, since the force in the optical axis direction (lateral direction in FIG. 3) A of reference mirror 20 is not applied to the interference unit 30, the interference unit 30 can be fixed with high accuracy without displacing the reference mirror 20 in the optical axis direction A, it can be fixed with high accuracy.

By providing a plurality of the keys 50 circumferentially around the interference unit 30, it is possible to further secure the fixing.

Figure 6A:
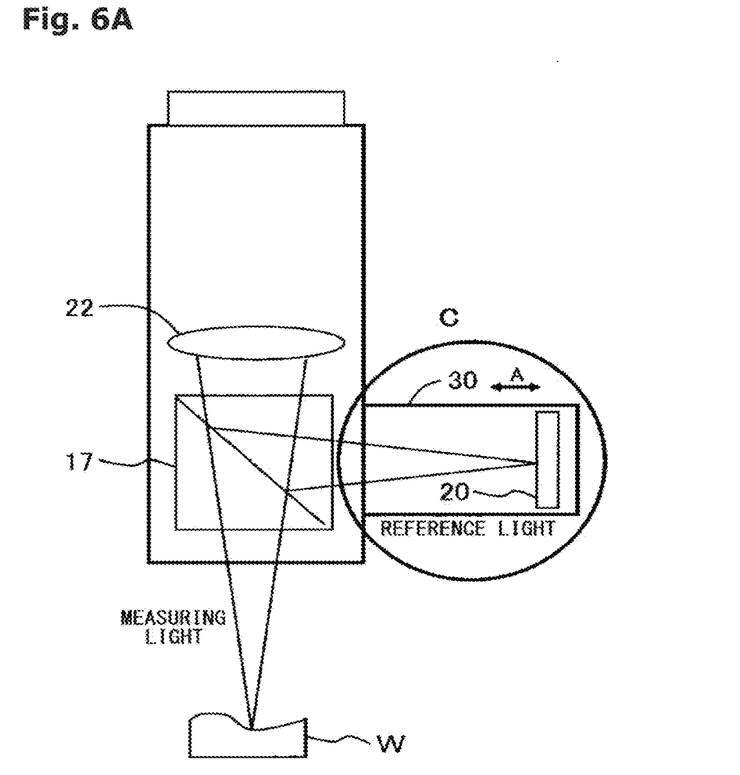
FIG. 6A is an optical path diagram schematically showing an optical head of a Michelson type white light interferometer to which the second embodiment of the present invention is applied.
Figure 6B:
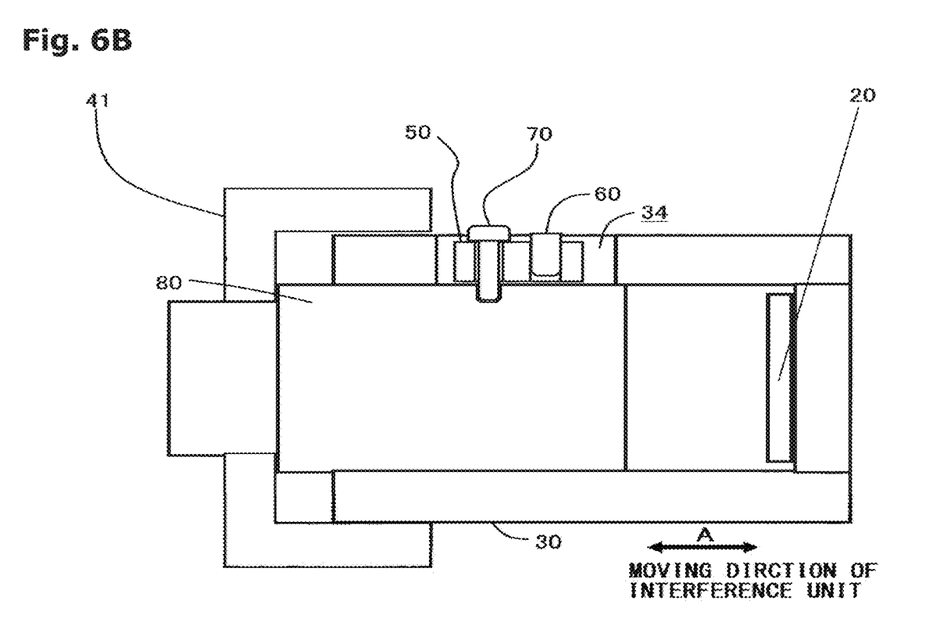
FIG. 6B is an enlarged longitudinal sectional view of the C portion in FIG. 6A, showing a fixing portion of the interference unit in a reference light path portion of the second embodiment of the present invention applied to Michelson type white light interferometer.

Next, referring to FIGS. 6A and 6B, a second embodiment of the present invention applied to the position adjusting and fixing device of an interference unit of a Michelson type white light interferometer.

This embodiment is applied to the Michelson type white light interferometer as shown in FIG. 6A, wherein an optical axis of an objective lens 22 and an optical axis of a reference mirror 20 is perpendicular. As shown in FIG. 6B, in a holding device 80 of the interference unit 30 is provided with an adjust ring 41, a key 50, a fixing screw 60, and a fitting screw 70 as in the first embodiment.

Also in this embodiment, as in the first embodiment, when the interference unit 30 comes to the required position by moving the interference unit 30 to optical axis direction (lateral direction in FIG. 6) A, the interference unit 30 is fixed by tightening the fixing screw 60 to spread and press the key 50 against the slotted hole 34 of the interference unit 30, it is possible to fix the interference unit 30.

In the Michelson type white light interferometer, not only optical axis direction position adjustment mechanism but also the tilt adjustment mechanism are required.

In the above embodiment, the present invention has been applied to a white light interferometer of a Mirau type and a Michelson type, but the application of the present invention is not limited to this, and other interferometers such as laser interferometers, and can be applied to general optical device for various applications.

Also, configuration of the fixing means and way to mount fixing means are not limited to key 50 or fitting screw 70.

Furthermore, object to be fixed such as objective lens and optical parts such as interference unit need not be separate bodies, and can be applied to cases where optical parts is incorporated in object to be fixed.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. An optical device provided with an optical parts position adjusting and fixing device for adjusting and fixing the position of the optical parts moving in an optical axis direction, wherein the position adjusting and fixing device is provided with a long slotted hole extended in the optical axis direction formed on a side surface of the optical parts; a fixing means which is mounted on an object to be fixed of the optical parts and which is movable along the long slotted hole; a non-penetrating screw hole formed in the fixing means and which is divided by a slit; and a screw which is screwed into the screw hole and spreads the slit when screwed into the screw hole so as to press the outer surface of the fixing means against the inner surface of long slotted hole.

2. An optical device provided with an optical parts position adjusting and fixing device according to claim 1, wherein the fixing means is formed with a through hole for fitting screw for attaching the fixing means to the object to be fixed of the optical parts, alongside the non-penetrating screw hole.

3. An optical device provided with an optical parts position adjusting and fixing device according to claim 1, a plurality of the fixing means are provided circumferentially around the optical parts.

4. An optical device provided with an optical parts position adjusting and fixing device according to claim 1, wherein the optical device is an interference unit of a white light interferometer, and the optical parts is a reference mirror for adjusting an optical path difference included in the interference unit.

5. An optical device provided with an optical parts position adjusting and fixing device according to claim 4, wherein the object to be fixed of the interference unit is a lens barrel of an interfering objective lens.

6. An optical device provided with an optical parts position adjusting and fixing device according to claim 4, wherein the optical device is an interference unit of a Mirau type white light interferometer wherein an optical axis of an objective lens which is the object to be fixed and an optical axis of reference mirror included in the interference unit which is the optical parts, is coaxially disposed.

7. An optical device provided with an optical parts position adjusting and fixing device according to claim 4, wherein the optical device is an interference unit of a Michelson type white light interferometer wherein an optical axis of an objective lens which is the object to be fixed and an axis of a reference mirror included in the interference unit which is the optical parts, is perpendicularly disposed.

* * * * *